JOHN H. KELLER.

Improvement in Harvester Reels,

No. 4,629. Reissued Nov. 7, 1871.

Witnesses,

R. J. Brown

R. D. Smith

John H. Keller,

By his attorney,

J. S. Brown.

THE NORRIS PETERS CO., PHOTO-LITHO., WASHINGTON, D. C.

UNITED STATES PATENT OFFICE.

JOHN H. KELLER, OF BOALSBURG, PENNSYLVANIA, ASSIGNOR, BY MESNE ASSIGNMENTS, OF PART INTEREST TO DANIEL F. LUSE AND J. F. SIEBERLING REAPER COMPANY.

IMPROVEMENT IN HARVESTER-REELS.

Specification forming part of Letters Patent No. 108,912, dated November 1, 1870; reissue No. 4,629, dated November 7, 1871.

*To all whom it may concern:*

Be it known that I, JOHN H. KELLER, of Boalsburg, in the county of Centre and State of Pennsylvania, have invented an Improved Harvester-Reel; and I do hereby declare that the following is a full and exact description thereof, reference being had to the accompanying drawing making part of this specification—

Figure 1:
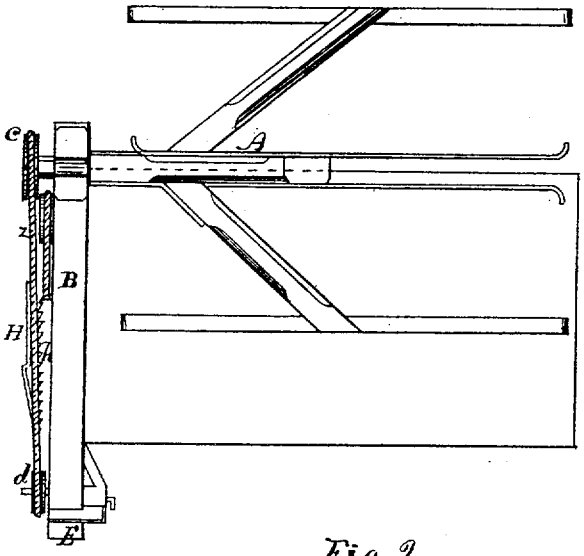
Figure 2:
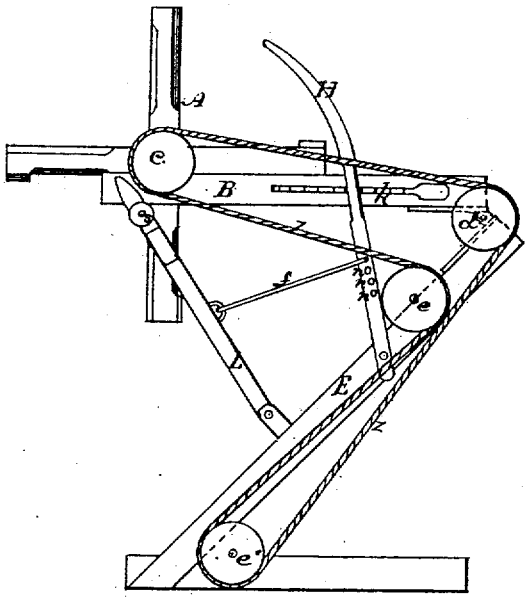

Figure 1 being a top view of a harvester-reel and its support provided with my improvements, Fig. 2 a side elevation of the same.

Like letters designate corresponding parts in both the figures.

My invention consists in the construction and arrangement of the reel-support and of the adjusting and operating parts thereon so that the driving chain or band is kept in nearly equal tension in the different positions to which the reel may be adjusted, and so that the extent of adjustment of the reel may be varied with a given movement of the adjusting lever, all substantially as herein specified.

The reel A has its bearing on the movable end of an arm, B, which is hinged or pivoted to the upper end of a fixed standard, E, that is secured to the finger-bar of the harvester, preferably in an oblique position, leaning backward, and located within convenient reach of the driver. The two parts B E thus compose a flexible or jointed reel-support. The movable arm B extends forward from the standard E in a horizontal or nearly horizontal direction, but is adjustable up and down therefrom. It is supported at its forward end by a brace or prop, L, which is pivoted to the standard E at its lower end, and at its upper end is forked so as to embrace the sides of the movable arm B, that rests on a friction-roller, *s*, in the fork, substantially as represented. This prop being situated in a position oblique to the arm B, by swinging its upper end forward or backward the arm and reel supported thereby are adjusted downward or upward.

In order to move the prop L and adjust the height of the reel a lever, H, is pivoted to the standard E back of the prop, and extends upward in the same general direction, as shown terminating at the upper end in a handle in a position to be readily grasped by the driver in his seat. This lever is connected with the prop L by a connecting-rod, *f*, which terminates in a hook or projection to enter any one of a row or set of holes, *n n*, in the lever, so that the same movement of the lever may produce greater or less movement of the prop according as the connecting-rod is attached further from or nearer to the pivot of the lever. The weight of the reel pressing forward, the prop L has a constant tendency to draw the lever forward; hence the lever requires only to be held back by engaging with some one of the teeth of a ratchet-bar, *k*, on the side of the arm B, as represented. The lever at any time can be drawn backward without regard to the ratchet-bar; but to move it forward it is first disengaged from the notches of the ratchet-bar.

The reel is driven by means of an endless chain or band, *z*, passing around a pulley, *c*, on the end of its shaft or axis; around a pulley, *e'*, at the bottom of the standard; around a loose pulley, *d*, concentric with the pivot joint of the arm B, so that its tension may be nearly the same in all positions of the arm; and around another loose pulley, *e*, on the standard E, in a position close to the pulley *d*, so as to bring the return fold of the chain or band into a position that will not materially disturb the tension when the reel-arm is adjusted.

What I claim as my invention, and desire to secure by Letters Patent, is—

1. A jointed adjustable reel-support, as herein described, provided with pulleys *c d e e'*, which bear the endless driving-chain or band of the reel, the same being arranged one upon the reel-shaft, one on a pivot concentric with the joint of the support, one near the latter within the angle of the joint, and one below on the standard of the support, in the manner shown, so as to keep the tension of the said chain or band nearly uniform in all the various positions to which the reel may be adjusted, substantially as herein specified.

2. The pivoted vibratory adjusting prop L, operating by means of a lever, H, connecting-rod *f*, and catch or ratchet-bar *k*, in combination with the jointed reel-support, substantially as and for the purpose herein specified.

3. In combination with the prop L, the vibratory lever H and connecting-rod *f*, the latter being connected with the lever or prop in adjustable positions, so as to vary the extent of movement of the prop with a given movement of the lever, as specified.

JOHN H. KELLER.

Witnesses:
W. A. TOBIAS,
U. P. STOOP.

(74)